F. V. SACKETT.
AUTOMATIC VALVE ALARM SYSTEM.
APPLICATION FILED DEC. 30, 1909. RENEWED JULY 12, 1913.
1,090,237.
Patented Mar. 17, 1914.
2 SHEETS—SHEET 1.
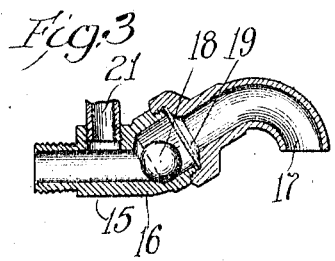
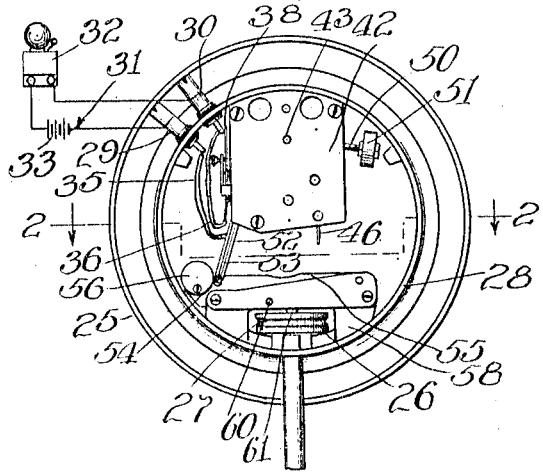
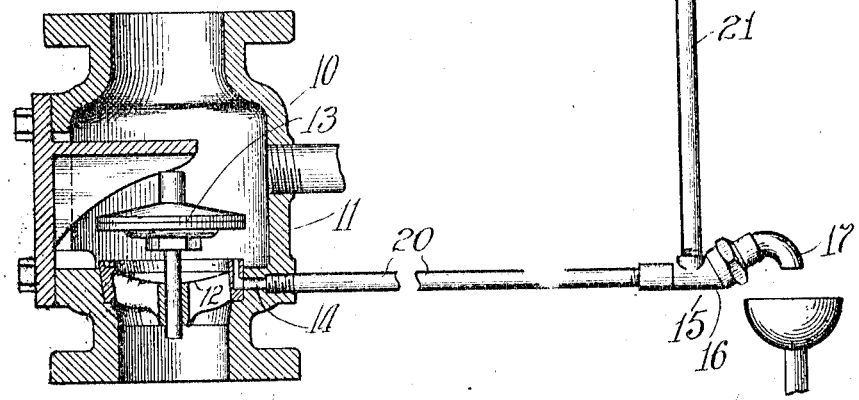
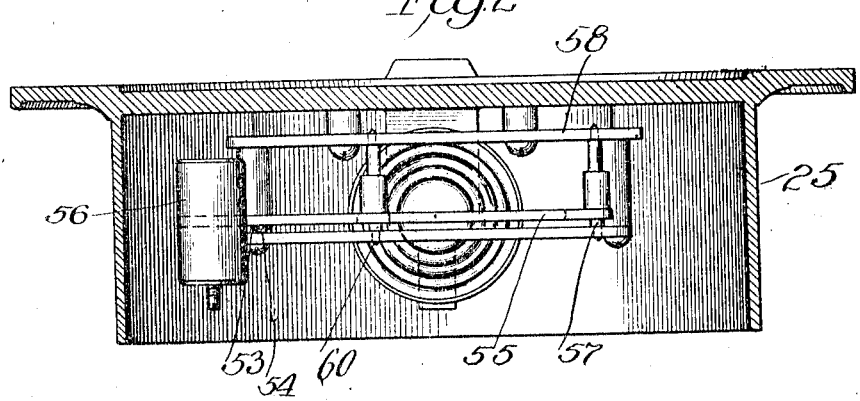
Witnesses:
H. R. L. White
R. A. White
Inventor
Frank V. Sackett
By Foree Bain and May
Attys F. V. SACKETT.
AUTOMATIC VALVE ALARM SYSTEM.
APPLICATION FILED DEC. 30, 1909. RENEWED JULY 12, 1913.
1,090,237.
Patented Mar. 17, 1914.
2 SHEETS—SHEET 2.
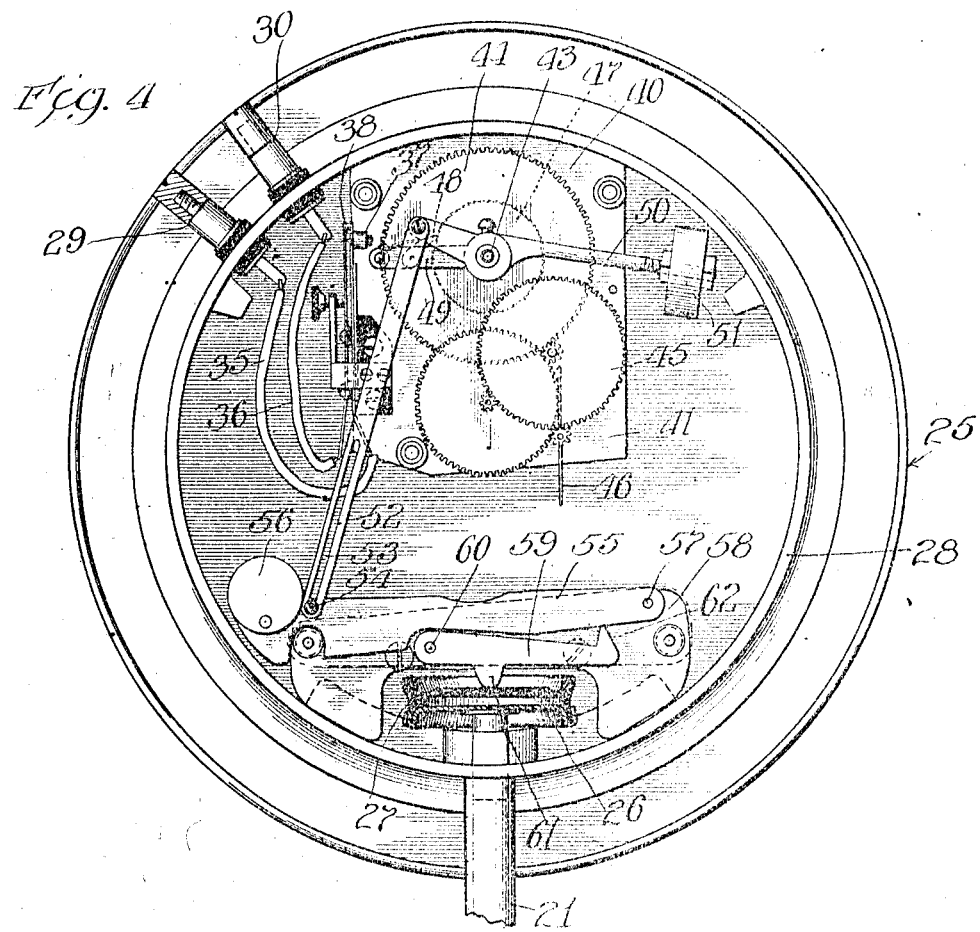
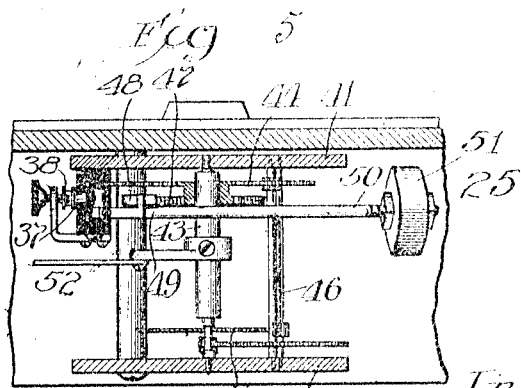

UNITED STATES PATENT OFFICE.

FRANK V. SACKETT, OF LA GRANGE, ILLINOIS, ASSIGNOR, BY DIRECT AND MESNE ASSIGNMENTS, TO GENERAL FIRE EXTINGUISHER COMPANY, OF PROVIDENCE, RHODE ISLAND, A CORPORATION OF NEW YORK.

AUTOMATIC VALVE-ALARM SYSTEM.

1,090,237.      Specification of Letters Patent.      Patented Mar. 17, 1914.

Application filed December 30, 1909, Serial No. 535,712. Renewed July 12, 1913. Serial No. 778,776.

*To all whom it may concern:*

Be it known that I, FRANK V. SACKETT, a citizen of the United States, residing at La Grange, in the county of Cook and State of Illinois, have invented certain new and useful Improvements in Automatic Valve-Alarm Systems, of which the following is a specification.

My invention relates to improvements in automatic valve-alarm systems, and has for its general object to provide a retarded valve alarm which will occasion a signal in the event of continued maintenance in open position of a main automatic valve, but which will not functionally respond to momentary openings of the valve such as occur as the result of "water hammer" in the valved piping.

One of the salient objects of my invention is to provide an arrangement whereby the retarding instrumentality is actuated wholly mechanically, and a further object is to provide an arrangement whereby the signaling apparatus is made substantially insensible to intermittent opening of the main valve, such as accompanies water hammer.

In the drawings, wherein I have shown an embodiment of my invention, Figure 1 shows a check valve, drip valve, and signal-initiating apparatus constituting a valve alarm system embodying my invention; Fig. 2 is a section on line 2—2 of Fig. 1; Fig. 3 is a vertical cross section of a suitable drip valve construction; Fig. 4 is an enlarged front view of the signal-initiating apparatus; and Fig. 5 is an elevation of the motor device.

Referring to the drawings, 10 indicates in general a check valve of a water distribution system, such as an automatic fire extinguisher system said valve (the construction of which *per se* forms no part of my invention) providing a casing, 11, having formed therein a seat, 12, overlain by a check valve, 13, said seat having a channel therein opening to an outlet port, 14, for the eduction of water under pressure whenever the valve is lifted from its seat, and the channel is correspondingly cleared.

15 indicates in general a drip valve construction, the form illustrated in Fig. 3 being convenient for the embodiment of my invention, but its specific construction *per se* being old. Said drip valve as shown comprises a suitable valve casing, 16, having a drip outlet, 17, partially controlled by a ball, 18, arranged to seat under pressure to close the outlet 17 except for the relief afforded by drip grooves, 19, in the seat of the valve and to fall back when water flow thereto is cut off. Thus under no circumstances does the ball, 18, close the drip orifice absolutely, although when the valve is under internal pressure of water flow, it reduces the drip outlet to a minimum free area, and when relieved of water pressure it opens the outlet thoroughly and quickly. This drip valve is arranged in connection with a pressure pipe section, 20, running to the outlet 14 of the main check valve, and is also connected with a pressure pipe section, 21, extending up from casing 16 in rear of the check valve ball, 18, (that is to say, on the pressure side thereof), to communicate pressure to the alarm device generally indicated at 25. The alarm device shown comprises a pressure responsive movable element, herein shown as a diaphragm, 26, forming a movable wall of chamber 27, opened to the pressure pipe, 21, but otherwise closed, and said diaphragm 26 constituting broadly a pressure-moved element communicating with the pressure pipe beyond the drip valve connection. Other pressure moved elements might be used.

A signal initiating instrumentality is provided, for control by the pressure-moved part 26, preferably comprising a signal device, a retarded working train or motor therefor having an actuating power element normally to exert its effort to effect the signaling operations, but normally restrained by a dominant restraining element, which prevents its operation and is capable of potentiating it after its operation. This dominant restraining element is in turn controlled by the pressure-moved part, such as the diaphragm 26, to release said power element from restraint when the dominant element is appropriately actuated by the pressure element; and all of these devices are preferably housed in a suitable containing casing.

In the specific construction 28 indicates the casing structure, preferably similar in form to a gage casing, providing binding posts, 29 and 30, for connection with a suitable signaling circuit, 31, including a signal device, such as the bell, 32, and a source of current supply, such as battery 33, said binding posts within the casing having respective connections, 35 and 36, to a movable contact, 37, and a stationary contact, 38, normally separated and adapted when forced into contact to close the signal circuit and occasion the ringing of the bell. This construction is simply typical of a motor-controlled signaling apparatus.

The signal contacts are arranged for control by a timing or retarded motor, 40, preferably embodied as a clock work train, having a movable weight, or equivalent spring, as its power element. In the construction shown, 41 and 42 indicate side plates, having mounted therein a main arbor 43, on which is loosely mounted a gear 44, communicating through a multiplying gearing, 45, to a fly, or other retarding governor, 46, said arbor 43 also carrying, loosely mounted thereon, but fixed to the gear 44 a ratchet, 47, borne upon by a pawl, 48, mounted on an arm 49, operating as a switch-closer for contacts 37—38 and secured to the shaft thereby, to connect the shaft and the train for movement together in one direction only. The arbor 43 further carries a lever arm 50, one extremity of which has adjustably mounted thereon a weight, 51, which constitutes the moving power element in the specific construction shown, the opposite extremity of the arm having pivotally connected thereto a link 52 for purposes to be described. The arrangement described is such that the upward movement of the weight 51 is relieved from restraint of the timing train and the concurrent movement of the switch-operating arm 49 away from the movable contact 37 is rapid, whereas the descent of the weight 51,—and consequently the switch-closing movement of the arm 49—is retarded by the action of the fan-governed train.

The link 52 has in its lower extremity a slot, 53, making connection with a pin, 54, upon a lever, 55, weighted as at 56 to exert a greater power than the weight 51, and serving as a dominant restraining element for said power element 51. The arm 55 is pivoted at 57 in a subsidiary frame, 58, secured in the casing above the diaphragm 26, and is so connected that its movements are controlled by the pressure element or diaphragm 26. To this end, I preferably mount a lever, 59, in the frame 58, pivoted at one end, as at 60, provided with a projection, 61, between its ends, bearing upon the center of the diaphragm and having at its free extremity a nose, 62, bearing upwardly against the lever 55 close to the pivot 57 of the latter. Slight movement of the diaphragm, 26, is multiplied to give relatively great movement to the weighted lever 55.

It will be understood that in the operation of the device, in connection with the check valve of a fire extinguisher system, the check valve normally closes the channel of the port 14 and the leak valve 15 permits the pipe 21 and its communicating diaphragm chamber, 27, to stand normally under substantially atmospheric pressure. Whenever the main check valve 13 rises, however, the pressure within the piping is communicated to the leak valve in the pipe 21, seating the valve ball as closely as may be, so that it drips only slightly and the confined water under considerable pressure rises in pipe 21 to the diaphragm chamber. Accordingly the diaphragm bulges outward, lifting the multiplying lever 59 and causing the weighted lever 55 constituting the dominating element to rise, thereby freeing from restraint the weighted or power element 50 which normally stands with its weight in raised position under the influence of the dominant restraining element. Accordingly the weight 51 begins its descent, retarded in point of time by its connection through ratchet 48 with the retarding train, and if the conditions above described be maintained for a predetermined length of time, the arm 49, sweeping upward, closes the electric contact of the bell circuit and thereby initiates a signal. If, however, before the lapse of the predetermined time, the main check valve is closed, the drip valve 15 quickly opens, immediately reducing the pressure in the pressure piping 21, and permitting the escape of the small quantity of water therein, so that the diaphragm 26 returns to normal position and the dominant weight 56 falls, causing pin 54 to strike the bottom of the slot 53 in link 52, and through said link raising the weighted arm 50 to its highest position, movement of the weighted arm 50 in an upward direction being unimpeded by the train, in virtue of the sliding of the pawl 48 over the inclined faces of the ratchet teeth. By the arrangement described, providing in combination with the main valve, the operations of which are to be supervised, a pressure piping and a quick acting release valve in the pressure piping, together with a dominant restraining element controlled by the pressure-responsive mechanism, a timing instrumentality having a power element controlled by the restraining element, and signaling mechanism for operation by the timing element, I am enabled to insure that a signal shall be occasioned whenever the main check valve is open for the predetermined length of time by means substantially insensible to any cumulative effect of intermittent opening and closing of the valve, the arrangement being such that the leak valve is able very quickly to relieve the pressure from the diaphragm or other pressure-responsive part, and yet is capable of maintaining a pressure thereon as long as the main valve is opened.

While I have herein described in some detail a particular embodiment of my invention, which I have employed in practice and found successfully to operate, it will be apparent to those skilled in the art that numerous changes might be made in the details of construction and arrangement of parts without departure from the spirit of the invention and within the scope of the appended claims.

What I claim is:

1. In a signal device of the character described, the combination of a pressure-responsive device, a dominant restraining element controlled by said pressure-responsive device, a retarded motor providing a power element movable for motor operation and for potentiation, connections for control of said power element as to both said movements by said dominant restraining element, and signaling means operatively associated with the motor.

2. In a signal device, the combination of a pressure-responsive device, a dominant-element controlled thereby, a power element, means for retarding operation of the power element in one direction, and means associated with said dominant element and power element for control of the latter by the former in the unretarded operation thereof.

3. In a signal device, the combination of a pressure-responsive device, signaling means, an element movable to initiate said signaling means, retard means for said element effective to retard movement thereof in one direction, and potentiating means for said movable element including a dominant element controlled by said pressure-responsive means.

4. A signal device for association with piping of the character described comprising signaling means, a power element operable to actuate the same, retard means effectual against actuating operation of said power element and ineffectual against return operation thereof, pressure-responsive means, and means including a restraining element dominant over the power element and associated with said pressure-responsive means and said power element for positive control of the unretarded movement of the latter.

5. The combination of a pressure-responsive device adapted to be connected with a pressure piping, a dominant restraining element arranged to be actuated by said pressure-responsive device, a motor comprising a power element, means for potentiation of the power element by the restraining element, said means including connections permitting functional operation of the power element when freed by actuation of the restraining element, and signaling means operable by said motor after a predetermined time of operation of the latter.

6. In an automatic valve alarm for use with a pressure piping, the combination of a signal-initiating apparatus comprising a pressure-responsive device, a dominant restraining element for actuation thereby, a retarded motor comprising a power element, means between said elements to release said power element for operation upon actuation of the dominant element by the pressure-responsive device and to return said power element to normal potential position from any position of operation upon the release of said restraining element by the pressure-responsive device, and signaling means associated with said motor.

7. In an automatic pressure alarm, for use with a suitable pressure piping, the combination of a casing, a pressure-moved part therein adapted to be connected in the pressure piping, a lever for pivotal movement in response to said pressure-moved part, a lever pivoted at one end to multiply movement of the first said lever, a restraining element upon the other end thereof receiving said multiplied movement, a retarded motor normally restrained by said restraining element, and released for operation by movement thereof in response to movement of the pressure-moved part, and signaling means operatively associated with the motor.

8. In an automatic pressure alarm, for use with a suitable pressure piping, the combination of a casing, motor means therein comprising a lever, a power element upon the end thereof, a retarding train, a ratchet connected therewith, a pawl connected with the lever of the power element to put the functional operation of said power element under the retarding effect of the train and to permit free return thereof to potential position; a dominant restraining element normally maintaining the power element in potential position, a pressure-moved part adapted to be connected with the pressure piping, and multiplying levers for applying motion of said pressure-moved part to move said dominant element from normal motor-restraining position, thereby to release the power element of the motor for functional operation.

9. In an automatic pressure alarm, for use with a suitable pressure piping, the combination of a casing, motor means therein comprising a lever, a power element therefor, a retarding train, a ratchet connected therewith, a pawl connected with the lever of the power element to put the functional operation of the power element under the retarding effect of the train and to permit free return of said element to potential position; a dominant restraining element normally maintaining the power element in potential position, a lever pivoted at one end and at the other secured to the dominant element, a lever pivoted at one end and at the other provided with a projection coacting with the first said lever near the pivotal point thereof to transmit multiplied movement to the dominant element, and a pressure-moved part adapted to be connected in the pressure piping and arranged to transmit movement to the second said lever.

10. In an automatic pressure alarm, the combination with a suitable pressure-moved part, of a motor comprising a power element, a dominant power element normally potentiating the power element of the motor, and restraining it from operation, said dominant power element movable by the pressure-moved part to release the power element of the motor for functional operation, and self-restoring when the pressure part is restored again to potentiate and restrain the power element of the motor.

11. In an automatic pressure alarm, the combination of a pressure-moved part, a dominating power element movable thereby and comprising a weighted lever, a motor having actuating means comprising a weighted lever, the motor actuating means being connected to said dominant power to have motor power stored therein when the dominating power element is in normal position, and freed for motor-driving application of said power when the dominant power element is moved by the pressure-moved part.

In testimony whereof I hereunto set my hand in the presence of two witnesses.

FRANK V. SACKETT.

In the presence of—
W. LINN ALLEN,
MARY F. ALLEN.